United States Patent
Delbos

(10) Patent No.: US 12,416,340 B2
(45) Date of Patent: Sep. 16, 2025

(54) BRAKE ASSEMBLY WITH THERMAL FUSE

(71) Applicant: Ratier-Figeac SAS, Figeac (FR)

(72) Inventor: Eric Delbos, Lacapelle-Marival (FR)

(73) Assignee: RATIER-FIGEAC SAS, Figeac (FR)

( * ) Notice: Subject to any disclaimer, the term of this patent is extended or adjusted under 35 U.S.C. 154(b) by 417 days.

(21) Appl. No.: 18/158,104

(22) Filed: Jan. 23, 2023

(65) Prior Publication Data

US 2023/0235798 A1 Jul. 27, 2023

(30) Foreign Application Priority Data

Jan. 27, 2022 (EP) ..................................... 22290001

(51) Int. Cl.

| | |
|---|---|
| *F16D 9/08* | (2006.01) |
| *F16D 63/00* | (2006.01) |
| *F16D 65/12* | (2006.01) |
| *F16H 57/00* | (2012.01) |
| *F16D 65/02* | (2006.01) |
| *F16D 66/00* | (2006.01) |
| *F16D 127/00* | (2012.01) |

(52) U.S. Cl.
CPC .............. *F16D 63/00* (2013.01); *F16D 9/08* (2013.01); *F16D 63/006* (2013.01); *F16D 65/12* (2013.01); *F16H 57/0018* (2013.01); *F16D 2065/1328* (2013.01); *F16D 2066/001* (2013.01); *F16D 2127/001* (2013.01); *F16D 2127/008* (2013.01)

(58) Field of Classification Search
CPC .......... F16D 63/00; F16D 63/006; F16D 9/08; F16D 65/12; F16D 2065/1328; F16D 2066/001; F16D 2127/001; F16D 2127/008; F16H 57/0018

USPC .................................................... 188/1.11 E
See application file for complete search history.

(56) References Cited

U.S. PATENT DOCUMENTS

| | | | | |
|---|---|---|---|---|
| 4,500,268 A | * | 2/1985 | Sundberg | ................. F04C 14/28 |
| | | | | 418/206.7 |
| 12,000,444 B2 | * | 6/2024 | Prouzet | ................... F16D 55/30 |
| 2023/0082894 A1 | * | 3/2023 | Sardi | ....................... B64C 25/42 |
| | | | | 188/72.1 |

FOREIGN PATENT DOCUMENTS

| | | |
|---|---|---|
| DE | 2826160 A1 | 1/1979 |
| EP | 1602845 A2 | 12/2005 |
| EP | 1602845 A3 | 12/2008 |
| EP | 3163049 A2 | 5/2017 |
| EP | 3163049 A3 | 7/2017 |

(Continued)

OTHER PUBLICATIONS

Abstract of FR2985294 (A1), Publication: Jul. 5, 2013, 1 page.
European Search Report for Application No. 22290001.1, mailed Jun. 28, 2022, 7 pages.

*Primary Examiner* — Christopher P Schwartz
(74) *Attorney, Agent, or Firm* — CANTOR COLBURN LLP

(57) ABSTRACT

The brake assembly includes a housing, a rotor disc. The rotor disc includes at least one internal cavity. The at least one internal cavity includes a pawl and a thermal fuse. In use, the thermal fuse is configured to maintain the position of the pawl in the at least one internal cavity when a temperature is below a predetermined threshold, and wherein the thermal fuse is configured to melt when a predetermined threshold of temperature is reached during braking to release the pawl out of the at least one internal cavity towards the housing. The housing includes at least one recess configured to receive the pawl.

16 Claims, 4 Drawing Sheets

(56) References Cited

FOREIGN PATENT DOCUMENTS

| | | | |
|---|---|---|---|
| FR | 2985294 | A1 | 7/2013 |
| GB | 798952 | A | 7/1958 |
| WO | 2020207925 | A1 | 10/2020 |

* cited by examiner

BRAKE ASSEMBLY WITH THERMAL FUSE

CROSS-REFERENCE TO RELATED APPLICATIONS

This application claims priority to European Patent Application No. 22290001.1 filed Jan. 27, 2022, the entire contents of which is incorporated herein by reference.

TECHNICAL FIELD

The present disclosure relates to brake assemblies and, in particular, a brake assembly with a thermal fuse.

BACKGROUND

It is common to use brakes in an aircraft to brake rotating components. For example, a helicopter may be provided with a brake to rapidly slow the rotor rotation after the engine has been switched off, after landing. The brake may also be used to stop the rotor from rotating under e.g. gusts of wind, while the helicopter is grounded. Similarly, a brake may be provided on an aircraft propulsion system, such as turbo-propeller (turboprop), turbofan, prop fan, open rotor etc. to rapidly slow rotation after the engine has been switched off, after landing. The brake may also be used to stop the rotor from rotating under e.g. gusts of wind, while the aircraft is grounded.

It is possible that the brake may be accidentally applied while the engine or propeller is still running, for example, due to a system failure. Also, when a rotor disc is contaminated, this may lead to a decrease of the friction coefficient and loss of a brake torque capability. This can lead to an abnormally high amount of energy being generated by the brake which can cause excessive heating of the brake, potentially causing a fire or thermally damaging the aircraft or engine components.

Such conventional brakes have generally been considered satisfactory for their intended purpose but it is desirable to mitigate the risk of overheating of a brake.

SUMMARY

In one aspect, there is provided a brake assembly that includes a housing and a rotor disc. The rotor disc includes at least one internal cavity, wherein the at least one internal cavity includes a pawl and a thermal fuse. In use, the thermal fuse is configured to maintain the position of the pawl in the at least one internal cavity when a temperature is below a predetermined threshold, and the thermal fuse is configured to melt when a predetermined threshold of temperature is reached during braking to release the pawl out of the at least one internal cavity towards the housing. The housing includes at least one recess configured to receive the pawl.

The brake assembly may further include at least one stator lining pad and a shaft connecting the rotor disc to a gearbox. The shaft may include a mechanical fuse. Further, when the pawl may be received by the at least one recess in the housing, in use, a predetermined threshold of torque is reached or exceeded at the mechanical fuse such that the mechanical fuse may break. A diameter of the mechanical fuse may be less than a diameter of the shaft.

A maximum operating temperature of the thermal fuse may be within the range of 100° C. to 1000° C. The thermal fuse may be configured to melt, to thermally decompose, or to substantially weaken when above its maximum operating temperature. Further, the internal cavity may include a spring configured to bias the pawl against the thermal fuse.

In another aspect, there is provided an aircraft that includes the brake assembly described above.

In yet another aspect, there is provided a method that includes providing a housing and providing a rotor disc. The rotor disc includes at least one internal cavity and the at least one internal cavity includes a pawl and a thermal fuse. The thermal fuse is configured to maintain the position of the pawl in the at least one internal cavity when a temperature is below a predetermined threshold, and the thermal fuse is configured to melt when a predetermined threshold of temperature is reached during braking to release the pawl out of the at least one internal cavity towards the housing. The housing includes at least one recess configured to receive the pawl.

The method may further include providing at least one stator lining pad and providing a shaft connecting the rotor disc to a gearbox. The shaft may include a mechanical fuse. Further, when the pawl may be received by the at least one recess in the housing, in use, a predetermined threshold of torque is reached or exceeded at the mechanical fuse such that the mechanical fuse breaks. A diameter of the mechanical fuse may be less than a diameter of the shaft.

A maximum operating temperature of the thermal fuse may be within the range of 100° C. to 1000° C. The thermal fuse may be configured to melt, to thermally decompose, or to substantially weaken when above its maximum operating temperature. Further, the internal cavity may include a spring configured to bias the pawl against the thermal fuse.

DETAILED DESCRIPTION

Figure 1:
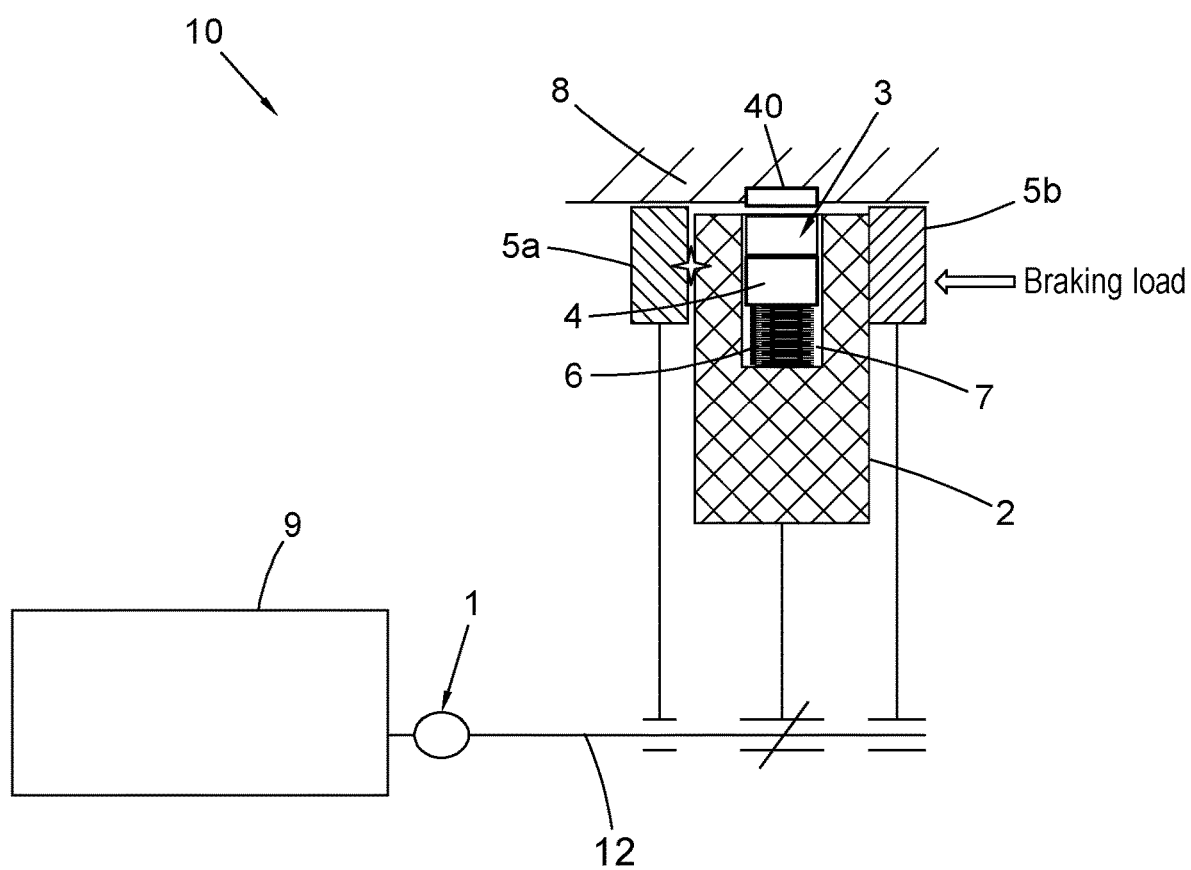
FIG. 1 shows an example of a brake assembly according to the present disclosure.

FIG. 1 shows an example of a brake assembly shown generally as 10. The brake assembly 10 may include a mechanical fuse 1 that connects a rotor disc 2 and a gearbox 9 via a shaft 12. The mechanical fuse 1 may rupture when a threshold of torque is achieved, or exceeded, from the rotor disc 2 which leads to a failure of the mechanical system such that brake temperature does not increase further during a system failure, as described in more detail below. Moreover, the mechanical rupture will lead to disconnecting the rotor disc 2 from the gearbox 9 which protects the gearbox 9 from excessive torque and also prevents further increases in the brake temperature.

The rotor disc 2 may include at least one internal cavity 7 that may include a thermal fuse 3, a pawl 4 and a spring 6. Of course, there may be provided several cavities in the rotor disc 2 and each cavity (such as cavity 7) may include a thermal fuse (e.g. thermal fuse 3), a pawl (e.g. pawl 4) and a spring (e.g. spring 6). As can be seen in FIG. 1, the thermal fuse 3 maintains the position of the pawl 4 in the internal cavity 7 of the rotor disc 2. The spring 6 is in a compressed state contacting the pawl 4. The pawl 4 is located in the internal cavity 7 between the spring 6 and the thermal fuse 3. Although the spring 6 is shown included within the internal cavity 7, it is to be understood that the spring 6 may not be present in the internal cavity and other biasing means may be used such as G-force, pressure etc.

Adjacent the rotor disc 2 is at least one stator lining pad 5a, 5b. As an example, there may be provided two stator lining pads (shown as 5a and 5b) provided on each side of the rotor disc 2. When braking is applied, the rotor disc 2 contacts the at least one stator lining pad 5a, 5b—for example, in the direction shown by the arrow labelled "Braking load". During a system failure, excessive heat may develop between the rotor disc 2 and the at least one stator lining pad 5a, 5b, which, without any intervention, could lead to a catastrophic event, such as fire ignition. For example, if there is an increase in temperature, this could lead to an ignition of fire in the fuel and oil in the engine area.

The brake assembly 10 may also include a housing 8. The housing 8 may include at least one recess 40 that is sized and shaped to receive the pawl 4, in use. Of course, if there is provided several cavities in the rotor disc 2, there may be provided several cavities that are configured to receive a pawl provided in each cavity. The recess 40 may act as a mechanical stop, as described in more detail below. This mechanical stop may be in one direction of rotation as an engine normally rotates in the same direction. Of course, the mechanical stop may be used in engines that rotate in alternate directions.

Figure 2:
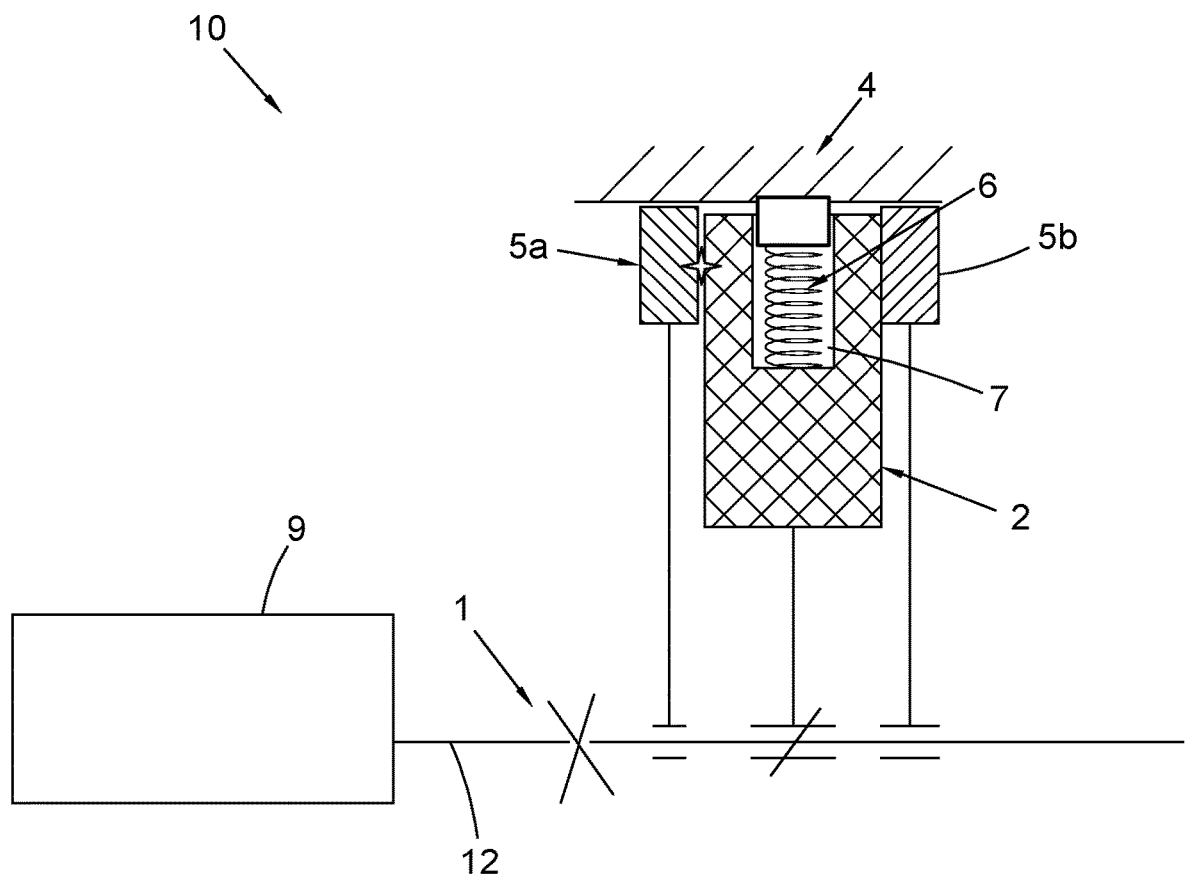
FIG. 2 shows an example of the brake assembly of FIG. 1 in use.

FIG. 2 shows the brake assembly 10 of FIG. 1 in use when a system failure and overheating has occurred. Here, the thermal fuse 3 of FIG. 1 is no longer present since it has melted due to the overheating. The thermal fuse 3 may have a maximum operating temperature greater than 100° C. and equal to or less than 1000° C. In other examples, the maximum operating temperature may be in the range of 450° C. to 700° C., or in the range of 625° C. to 675° C. In one example, the maximum operating temperature may be 645° C. (i.e. this may be the melting temperature of the material of the thermal fuse 3). If the temperature in the brake assembly 10 rises above the threshold (e.g. the melting point of the eutectic material), as a result of heat of friction between the rotor disc 2 and the at least one stator lining pad 5a, 5b, the thermal fuse 3 will melt (or thermally decompose, substantially weaken etc.). Of course, if the temperature of the brake assembly 10 remains below the threshold (e.g. the melting point of the eutectic material), the thermal fuse 3 does not melt and remains as a solid/rigid component that prevents any release of the pawl 4.

When the thermal fuse 3 has melted (or thermally decomposed, substantially weaken etc.), the spring 6 moves from a compressed state to a decompressed state, which, in turn, moves the pawl 4 out of the internal cavity 7 (e.g. through an opening (not shown)) of the rotor disc 2 towards the brake assembly housing 8. As the rotor disc 2 rotates and the pawl 4 is biased towards the brake assembly housing 8, the pawl 4 contacts the recess 40 (shown in FIG. 1) provided in the housing 8. The contact of the pawl 4 and the recess 40 provided in the housing 8 acts as a mechanical stop, which, in turn, jams the rotor disc 2. The torque provided to the mechanical fuse 1 increases due to the rotor disc 2 being jammed. As soon as the torque reaches, or exceeds, a predetermined threshold (e.g. between 1.5 to 3 times the maximum braking torque), the mechanical fuse 1 fails (represented by an X in FIG. 2), which, disconnects the rotor disc 2 from driving the gearbox and leads to no further increase in brake temperature. The function of the mechanical fuse, 1 is to disconnect the link between the brake (e.g. the rotor disc 2 and the at least one stator lining pad 5a, 5b) and the gearbox 9 to allow a normal operating of the gearbox 9 even if the brake assembly 10 is jammed.

Figure 3:
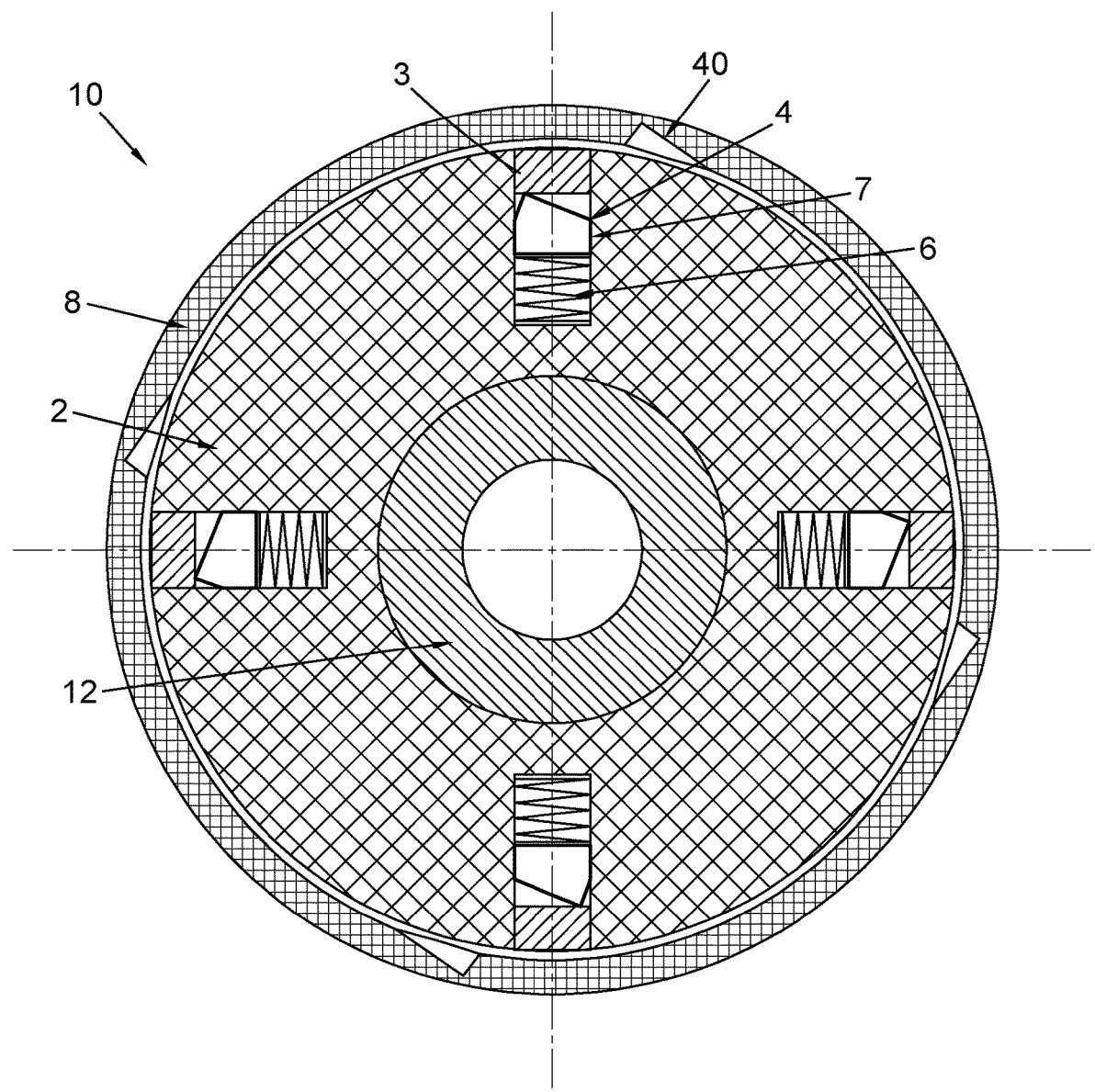
FIG. 3 shows another view of the brake assembly of FIG. 1.

FIG. 3 shows another view of the brake assembly 10 of FIG. 1. As can be seen in this Figure, the brake assembly 10 includes at least one internal cavity 7 that may include the spring 6, the pawl 4 and the thermal fuse 3. As shown in FIG. 3, the pawl 4 has an irregular pentagon shape. The recess 40 that is provided in the housing 8 is sized and shaped to receive a portion of the irregular pentagon shaped pawl 4. FIG. 3 demonstrates that the recess 40 is sized and shaped to receive at least one pawl 4. Of course, although the pawl 4 in FIG. 3 is shown to be an irregular pentagon, it is to be understood that any shape (regular or irregular) may be used for the pawl 4 and the recess 40.

Figure 4:
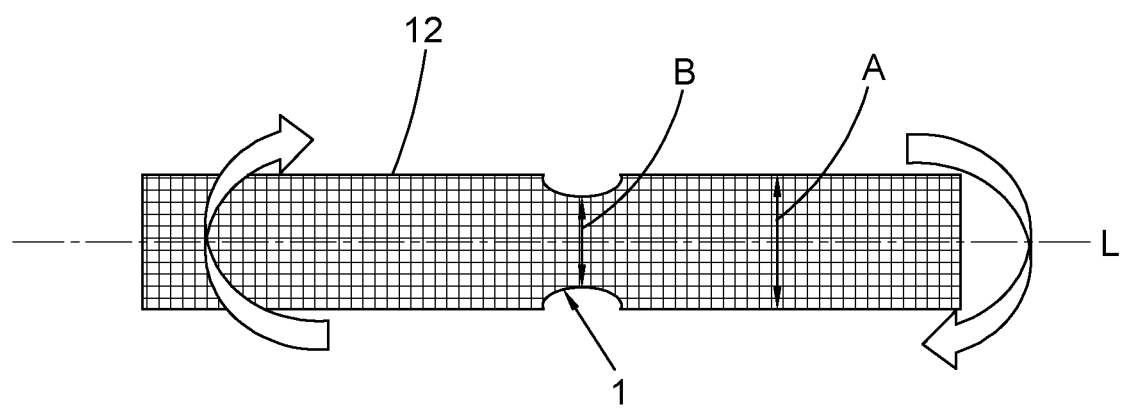
FIG. 4 shows an example of a mechanical fuse used in the brake assembly of FIG. 1.

FIG. 4 shows an example of a mechanical fuse 1 (e.g. the mechanical fuse 1 shown in FIG. 1) provided on the shaft 12. The shaft 12 includes a longitudinal axis L, around which the shaft 12 rotates. The shaft 12 has a diameter, A. As can be seen in FIG. 3, the mechanical fuse 1 is a point in the shaft 12 where torque may break or fracture the shaft 12. In order to achieve this, the mechanical fuse 1 is provided with a diameter, B, that is less than A. Referring to FIGS. 1, 2 and 3, when the pawl 4 is received in the recess 40 of the housing 8, the torque provided to the mechanical fuse 1 increases when the rotor disc 2 is jammed. When the torque reaches a predetermined threshold, the mechanical fuse 1 will break or fracture. Therefore, the link between the brake (e.g. the rotor disc 2 and the at least one stator lining pad 5a, 5b) and the gearbox 9 is disconnected.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A brake assembly, the brake assembly comprising:
   a housing;
   a rotor disc, the rotor disc including at least one internal cavity;
   wherein the at least one internal cavity includes a pawl and a thermal fuse; and
   wherein, in use, the thermal fuse is configured to maintain the position of the pawl in the at least one internal cavity when a temperature is below a predetermined threshold, and wherein the thermal fuse is configured to melt when a predetermined threshold of temperature is reached during braking to release the pawl out of the at least one internal cavity towards the housing, and wherein the housing includes at least one recess configured to receive the pawl.

2. The brake assembly of claim 1, further comprising:
   at least one stator lining pad;
   a shaft connecting the rotor disc to a gearbox.

3. The brake assembly of claim 2, wherein the shaft includes a mechanical fuse.

4. The brake assembly of claim 3, wherein, when the pawl is received by the at least one recess in the housing, in use, a predetermined threshold of torque is reached or exceeded at the mechanical fuse such that the mechanical fuse breaks.

5. The brake assembly of claim 3, wherein a diameter of the mechanical fuse is less than a diameter of the shaft.

6. The brake assembly of claim 1, wherein a maximum operating temperature of the thermal fuse is within the range of 100° C. to 1000° C.

7. The brake assembly of claim 6, wherein the thermal fuse is configured to melt, to thermally decompose, or to substantially weaken when above its maximum operating temperature.

8. The brake assembly of claim 1, wherein the internal cavity includes a spring configured to bias the pawl against the thermal fuse.

9. An aircraft including the brake assembly as claimed claim 1.

10. A method, the method comprising:
providing a housing;
providing a rotor disc, wherein the rotor disc includes at least one internal cavity, and wherein the at least one internal cavity includes a pawl and a thermal fuse; and
wherein the thermal fuse is configured to maintain the position of the pawl in the at least one internal cavity when a temperature is below a predetermined threshold, and wherein the thermal fuse is configured to melt when a predetermined threshold of temperature is reached during braking to release the pawl out of the at least one internal cavity towards the housing, and wherein the housing includes at least one recess configured to receive the pawl.

11. The method of claim 10, further comprising:
providing at least one stator lining pad; and
providing a shaft connecting the rotor disc to a gearbox.

12. The method of claim 11, wherein the shaft includes a mechanical fuse.

13. The method of claim 12, wherein, when the pawl is received by the at least one recess in the housing, in use, a predetermined threshold of torque is reached or exceeded at the mechanical fuse such that the mechanical fuse breaks.

14. The method of claim 12, wherein a diameter of the mechanical fuse is less than a diameter of the shaft.

15. The method of claim 10, wherein a maximum operating temperature of the thermal fuse is within the range of 100° C. to 1000° C.

16. The method of claim 15, wherein the thermal fuse is configured to melt, to thermally decompose, or to substantially weaken when above its maximum operating temperature.

* * * * *